UNITED STATES PATENT OFFICE.

JOHN W. DUNFORD, OF ATLANTA, GEORGIA.

PAINT COMPOSITION.

1,170,883.   Specification of Letters Patent.   Patented Feb. 8, 1916.

No Drawing.   Application filed May 1, 1915.   Serial No. 25,326.

*To all whom it may concern:*

Be it known that I, JOHN W. DUNFORD, a citizen of the United States, residing at Atlanta, in the county of Fulton and State of Georgia, have invented certain new and useful Improvements in Paint Compositions, of which the following is a specification.

This invention comprehends certain new and useful improvements in paint compositions, and has for its primary object to provide certain improvements in the composition for which I obtained Letters Patent of the United States, No. 1,091,309, issued March 24, 1914.

The patented print composition embodies the characteristic of capability of resisting the action of the elements, both air and water, and has been found particularly desirable and effective as a coating or impregnating fluid for roofs and bridges or wherever it is desired to preserve any structures, especially those that are exposed; and the present invention aims to still further improve the composition by the addition of ingredients for the purpose of bringing out slate and brown colors and to further increase the lasting qualities of the paint.

With this and other objects in view, as will more fully appear as the description proceeds, the invention consists in a paint composition composed, in addition to the ingredients embodied in the originally patented paint composition, of the following ingredients, namely, ground slate ground in linseed oil and pine tar, preferably North Carolina pine tar. In other words, the composition as improved, will contain the following ingredients hereinbelow named and mixed substantially in or about the proportions specified, namely, Coal tar _____ 25 gallons,
Oil of tar _____ 25 gallons,
Graphite _____ 25 pounds,
Linseed oil _____ 5 gallons,
Yellow ocher _____ 15 pounds,
Oxid of iron _____ 20 pounds,
Spirits of turpentine _____ 5 gallons,
Slate ground in linseed oil _____ 20 pounds,
North Carolina pine tar _____ 10 gallons.

In carrying out the present invention, I take about twenty-five gallons of coal tar (preferably Jellico coal tar) and twenty-five gallons of oil of tar, and put them in a distillery and distil for about twelve or fourteen minutes, so that all imperfections will be distilled out. These two ingredients constitute the body of my improved paint composition and as is manifest, this body not only possesses considerable tensile strength, as well as elasticity, but is capable of resisting wear and the action of the elements to a maximum degree. I next take twenty-five pounds of graphite to five gallons of linseed oil (well ground) and I then take fifteen pounds of yellow ocher, twenty pounds of oxid of iron (also ground in oil) with five gallons of spirits of turpentine for a drier and thinner. In addition to the foregoing, I also add twenty pounds of ground slate ground in linseed oil, and ten gallons of North Carolina pine tar. While the body of the paint is yet warm, these other ingredients are thoroughly mixed therewith and ground together, which will make the composition ready for use in connection with all manner of roofing and bridge work, as well as for other work generally.

While my improved paint composition is primarily designed for use on roofs and bridges, I have clearly demonstrated that it is also effective on the hulls or bottoms of marine vessels, as it is impervious to salt or fresh water, and that it is useful not only for iron and steel bridges, but wooden bridges, posts, or any part which it is desired to maintain in a good state of preservation after being partially or entirely buried in the ground. It will be found to be absolutely water-proof, and by the use of the ground slate and pine tar, above referred to, the desired slate and brown colors will be properly brought out while at the same time not only are the desired perfect colors obtained, but the lasting qualities of the composition are increased.

While the tars in their crude form have heretofore been considered somewhat injurious, especially to metal roofing, I have found that by distilling out the imperfections, as hereinbefore described, the paint will be as harmless as any oil paint which has been produced, while my experience has at the same time shown that the great body and durability inherent in these tars, makes them a peculiarly good body with which to combine the other ingredients.

What is claimed, is:

1. The herein described paint composition, consisting of a body composed of coal tar and oil of tar, said body being mixed with graphite, linseed oil, yellow ocher, oxid of iron, spirits of turpentine, ground slate and pine tar.

2. The herein described paint composition, consisting of the following ingredients in substantially the specified proportions, namely, a body composed of coal tar twenty-five gallons and oil of tar twenty-five gallons, mixed with graphite twenty-five pounds, linseed oil five gallons, yellow ocher fifteen pounds, oxid of iron twenty pounds, spirits of turpentine, five gallons slate ground in linseed oil, twenty pounds, and pine tar ten gallons.

In testimony whereof I hereunto affix my signature in the presence of two witnesses.

JOHN W. DUNFORD.

Witnesses:
OLIN O. RAMBO,
A. E. RAMSAUR.